Patented Sept. 8, 1953

2,651,663

UNITED STATES PATENT OFFICE 2,651,663

PRODUCTION OF POLY-PENTA-ERYTHRITOLS

Stanley F. Marrian, Ardrossan, and Andrew McLean, West Kilbride, Scotland, assignors to Imperial Chemical Industries Limited, a corporation of Great Britain No Drawing. Application July 23, 1947, Serial No. 763,174. In Great Britain August 2, 1946

10 Claims. (Cl. 260—615)

The present invention relates to a process for the production of poly-pentaerythritols.

Solid poly-pentaerythritols are formed as by-products in the condensation reaction between acetaldehyde and formaldehyde in aqueous alkaline media, and one or more of them are present both in the resulting crude pentaerythritol and in the mother liquors from which the crude pentaerythritol is crystallized. The best characterized of the solid poly-pentaerythritols is di-pentaerythritol and a solid tri-pentaerythritol is also stated in the literature to have been isolated, although the method of isolation has not yet been disclosed. The solid polypentaerythritols are rather difficult to remove from the pentaerythritol and are difficult to separate from one another, and the name pleo-pentaerythritol has been applied to a poly-pentaerythritol fraction that is stated to contain a tri-pentaerythritol along with di-pentaerythritol and other poly-pentaerythritols.

The poly-pentaerythritols have already attracted interest as possible raw materials, for instance for the production of alkyd resins for which they are stated to be in some respects superior to pentaerythritol.

Hitherto there has been no method available for converting pentaerythritol into poly-pentaerythritols or poly-pentaerythritols into higher poly-pentaerythritols, the only source of the poly-pentaerythritols being the by-products accompanying the pentaerythritol formed in the aforesaid condensation reaction. These by-products usually include also syrupy condensation products and other undesirable products formed by the self-condensation of formaldehyde that render the separation of a solid poly-pentaerythritol mixture troublesome, and the fact that the poly-pentaerythritols cannot be produced without at the same time producing several times their own weight of pentaerythritol would constitute a serious drawback to their industrial employment.

We have now found that when pentaerythritol is heated in presence of a non-aqueous liquid solvent comprising an organic sulphonic acid at a temperature preferably not below about 100° C. and preferably under conditions such that water is removed, an etherification reaction proceeds with the progressive formation of water and of poly-pentaerythritols, while solid poly-pentaerythritols or their mixtures with pentaerythritol similarly treated undergo etherification with the progressive formation of water and higher poly-pentaerythritols.

According to the present invention the process for the production of polypentaerythritols comprises heating pentaerythritol and/or one or more polypentaerythritols of lower molecular weight with an organic sulphonic acid.

Preferably the heating is effected in the presence of an organic liquid substantially chemically unacted upon by said organic sulphonic acid and the temperature of heating is not below 100° C.

The organic sulphonic acid used may be aliphatic or aromatic and it may be brought into fluid condition by fusion or with the aid of non-aqueous indifferent organic solvents for the organic sulphonic acid. Preferably not less than $\frac{1}{10}$ mol sulphonic acid per mol pentaerythritol is used, and considerably larger quantities may be used with advantage. It is convenient to carry out the reaction in such a manner that the water formed in the reaction is removed from the system as the reaction proceeds along with the vapour of a water immiscible volatile organic solvent of the aforesaid character boiling at a temperature above 100° C., the condensed organic solvent phase of the resulting distillate being returned to the reaction mixture. Hydrocarbon solvents and stable chlorinated hydrocarbon solvents are especially suitable, and it will usually be found that the solubility of pentaerythritol in the solution of the organic sulphonic acid in such solvent is substantially higher than that of the pentaerythritol in the solvent in the absence of the organic sulphonic acid.

The extent to which the etherification of the raw materials progresses may be controlled by cooling the reaction mixture so as to interrupt the distillation of the water when a predetermined amount of water has been distilled over, and the amount of water which may be removed by prolonging the reaction approaches that which would theoretically be obtained if the whole of the available hydroxyl groups in the starting material were converted into ether groups, which in the case of pentaerythritol is 2 mols water per mol pentaerythritol.

The resulting products may or may not crystallize out when the reaction mixture is cooled. When the reaction mixtures are evaporated to dryness they frequently form syrups, from which the products may often be obtained in solid form when the syrup is treated with a suitable organic solvent for the organic sulphonic acid and any sulphonic ester formed, that is a non-solvent or poor solvent for the poly-pentaerythritol e. g. ether, chloroform, or benzene. While the amount of sulphonic ester present in the final product is usually small, in some cases it may be desirable to apply a neutralization or even a saponification treatment to assist in the separation of the crude poly-pentaerythritol. It will be understood that in general the etherification reaction product will be a mixture of poly-pentaerythritols which may still contain some of the raw material unaltered, and if desired the crude poly-pentaerythritol may be recrystallized from water in order to modify its composition by purifying it from the more easily soluble constituents such as pentaerythritol.

*Example I*

117 gm. para-toluene sulphonic acid (.62 mol) are added to 700 ml. tetra chloroethane in a distilling vessel having a graduated trap and a condenser arranged in such a way that the vapors are condensed into the said trap for separation and measurement of the water formed during the reaction, and so that the denser portion of the condensate is continuously returned to the reaction mixture. The mixture is boiled for some time in order to eliminate any moisture present in the ingredients, the tetrachloroethane layer in the condensate being returned continuously to the distillation vessel. Boiling is discontinued and 136 grams of pentaerythritol are added to the solution, and the boiling is recommenced. The pentaerythritol dissolves fairly rapidly and the water eliminated collects along with the tetrachloroethane in the graduated trap and floats to the top. After 9 ml. (½ mol/mol pentaerythritol) of water have collected the reaction is stopped and the tetrachloroethane is distilled off under reduced pressure and the syrup left behind purified by extraction with an organic non-solvent such as chloroform or benzene. This causes it to solidify. The crude poly-pentaerythritol weighs about 100 grams and still contains about 3.5% free acid. The saponification value indicates that the content of esterified hydroxyl group is only 0.74%. The free hydroxyl content is 36.9%. An alternative method of isolating the poly-pentaerythritol from the reaction mixture is by allowing the latter to cool to ordinary temperature and filtering off the crystals of crude poly-pentaerythritol that separate out.

*Example II*

The reaction is carried out essentially as indicated in Example I except that more water is distilled off. 136 grams of pentaerythritol are again used and 13.5 ml. of water are distilled out (¾ mol/mol pentaerythritol). The polypentaerythritol mixture obtained from the reaction is found to have 2.8% free acidity and the saponification value indicated that only 0.76% of the hydroxyl content is esterified. The hydroxyl content is found to be 33.0%. That calculated for tetrapentaerythritol which would theoretically result from the elimination of ¾ mol water is 34.7%.

*Example III*

A preparation carried out as in Example I, but employing methane sulphonic instead of p-toluene sulphonic acid gives a product very similar to that obtained in Example I.

We claim:

1. A process for the production of polypentaerythritols which comprises heating a material from the group consisting of pentaerythritol, polypentaerythritols of lower molecular weight than the desired products and mixtures thereof at a temperature above 100° C. in the presence of an organic sulfonic acid and a water-immiscible volatile organic solvent selected from the group consisting of hydrocarbon and chlorinated hydrocarbon solvents which are chemically inert toward pentaerythritol and said organic sulfonic acid and removing water formed by the reaction from the reaction mixture by distillation along with vapors of said organic solvent, the quantity of sulfonic acid used being at least $\tfrac{1}{10}$ mol per mol of pentaerythritol employed.

2. A process as claimed in claim 1, wherein the extent of reaction is controlled by cooling the mixture below the point at which water distils from the reaction mixture after a predetermined amount of water has been removed from the reaction mixture.

3. A process as claimed in claim 1 wherein said water-immiscible volatile organic solvent is one having a boiling point above 100° C.

4. A process for the production of polypentaerythritols which comprises heating a material from the group consisting of pentaerythritol, polypentaerythritols of lower molecular weight than the desired product and mixtures thereof at a temperature above 100° C. in the presence of an organic sulphonic acid and a water-immiscible volatile organic solvent selected from the group consisting of hydrocarbon and chlorinated hydrocarbon solvents which are chemically inert toward pentaerythritol and said organic sulphonic acid and removing water formed from the reaction mixture along with vapors of said organic solvent by distillation.

5. A process for producing polypentaerythritols which comprises heating in the presence of an organic sulphonic acid, a substance selected from the group consisting of pentaerythritol, polypentaerythritols having a molecular weight lower than that of the desired product, and mixtures thereof, and removing water formed from the reaction mixture.

6. A process as claimed in claim 4 wherein the organic sulphonic acid is para-toluene sulphonic acid.

7. A process as claimed in claim 4 wherein the organic sulphonic acid is methane sulphonic acid.

8. A process as claimed in claim 4 wherein the water-immiscible volatile solvent is tetrachlorethane.

9. A process for producing polypentaerythritols which comprises heating in the presence of an organic sulphonic acid, a substance selected from the group consisting of pentaerythritol, polypentaerythritols having a molecular weight lower than that of the desired product, and mixtures thereof, and removing water formed from the reaction mixture, the quantity of sulphonic acid used being at least $\tfrac{1}{10}$ mol per mol of pentaerythritol employed.

10. The method of dehydrating a pentaerythritol selected from the group consisting of pentaerythritol, dipentaerythritol and tripentaerythritol which comprises forming a mixture of the selected pentaerythritol with the sulfonic acid of a monocyclic aromatic hydrocarbon and heating the mixture at a temperature at which water begins to boil out, separating water as liberated during the said heating, and discontinuing the heating when the hydroxyl content of the resulting partially dehydrated pentaerythritol falls to a value within the range of about 33% to 37% of the weight of the partially dehydrated pentaerythritol.

STANLEY F. MARRIAN
ANDREW McLEAN.

References Cited in the file of this patent

UNITED STATES PATENTS

| Number | Name | Date |
|---|---|---|
| 2,056,830 | Coleman et al. | Oct. 6, 1936 |
| 2,401,743 | Bowman et al. | June 11, 1946 |
| 2,462,047 | Wyler | Feb. 15, 1949 |
| 2,468,722 | Wyler | Apr. 26, 1949 |